United States Patent
Jakoby et al.

(10) Patent No.: US 6,988,405 B2
(45) Date of Patent: Jan. 24, 2006

(54) DEVICE FOR MEASURING LEVELS

(75) Inventors: Bernhard Jakoby, Vienna (AT); Matthias Buskies, Eningen (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 10/501,294

(22) PCT Filed: Sep. 23, 2002

(86) PCT No.: PCT/DE02/03564

§ 371 (c)(1),
(2), (4) Date: Nov. 16, 2004

(87) PCT Pub. No.: WO03/060438

PCT Pub. Date: Jul. 24, 2003

(65) Prior Publication Data

US 2005/0072228 A1  Apr. 7, 2005

(30) Foreign Application Priority Data

Jan. 18, 2002  (DE) .......................... 102 02 030

(51) Int. Cl.
G01F 23/00 (2006.01)

(52) U.S. Cl. .................................. 73/304 C
(58) Field of Classification Search ............... 73/304 C
See application file for complete search history.

(56) References Cited

U.S. PATENT DOCUMENTS

| | | | | |
|---|---|---|---|---|
| 2,559,456 A | * | 7/1951 | Meyer ..................... | 105/190.2 |
| 3,103,815 A | | 9/1963 | Gardner | |
| 4,429,343 A | * | 1/1984 | Freud ......................... | 361/286 |
| 4,564,882 A | * | 1/1986 | Baxter et al. ................ | 361/286 |
| 4,831,493 A | * | 5/1989 | Wilson et al. .............. | 361/286 |
| 5,437,184 A | | 8/1995 | Shillady | |
| 6,222,376 B1 | * | 4/2001 | Tenney, III ................. | 324/664 |

FOREIGN PATENT DOCUMENTS

| | | |
|---|---|---|
| DE | 2 930 051 | 2/1981 |
| DE | 43 23 827 | 12/1994 |
| DE | 196 49 366 | 6/1998 |
| DE | 101 18 061 | 10/2002 |
| WO | WO 9930117 | 6/1999 |

* cited by examiner

Primary Examiner—Hezron Williams
Assistant Examiner—Katina Wilson
(74) Attorney, Agent, or Firm—Kenyon & Kenyon

(57) ABSTRACT

A device for measuring fill levels, in particular liquid fill levels, is provided, which device has a capacitive sensor and, connected to the sensor, a unit for analyzing a measuring signal from the sensor. The device for measuring fill levels may be manufactured cost-effectively and enables highly accurate measurements. The sensor has at least two base components including finger-shaped electrodes projecting therefrom. The electrodes are situated offset from one another, and the base components are fixed in position with respect to one another by at least one fixing element, the fixing element being situated outside the overlapping area of the electrodes.

10 Claims, 1 Drawing Sheet

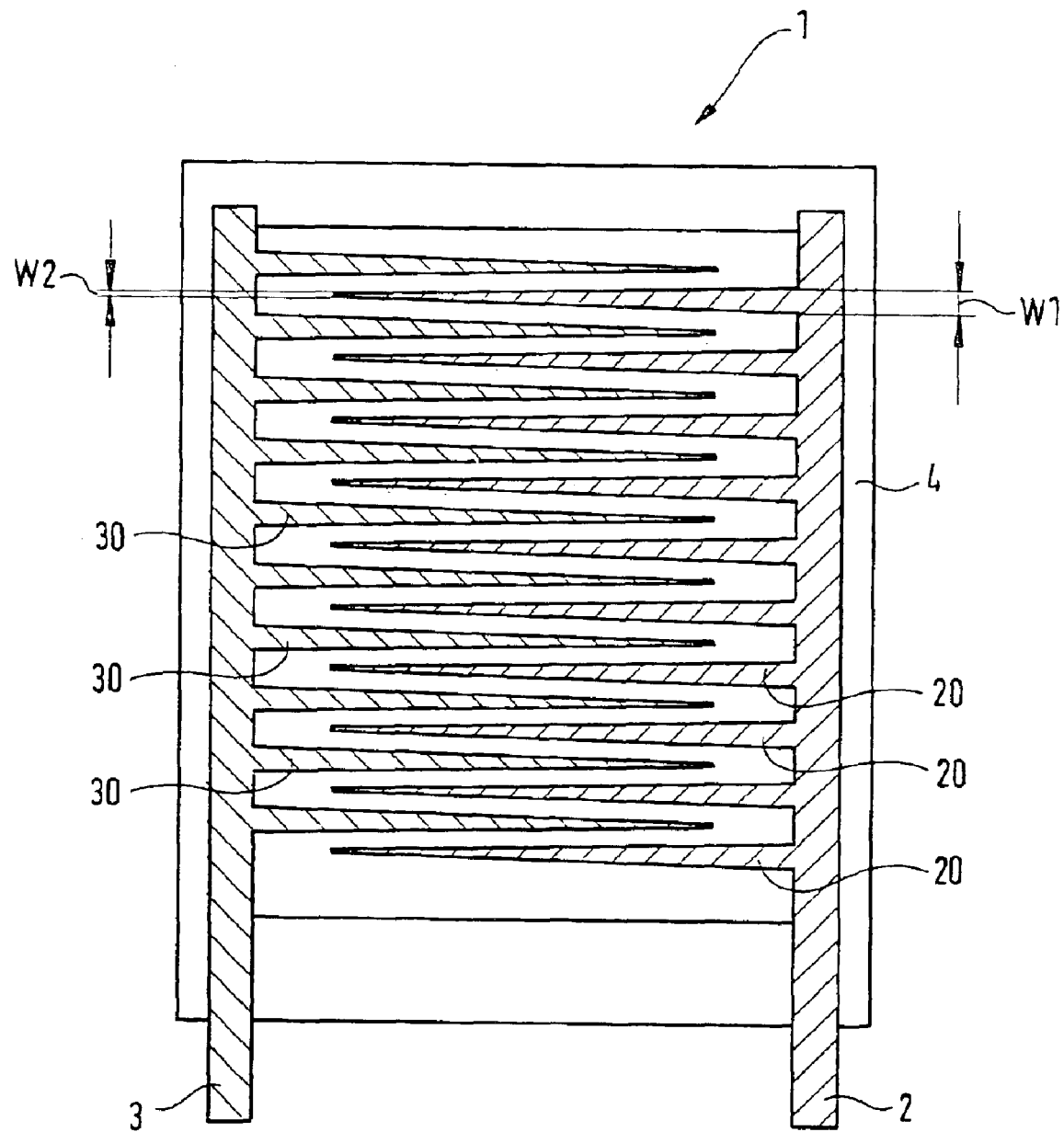

DEVICE FOR MEASURING LEVELS

FIELD OF THE INVENTION

The present invention relates to a device for measuring fill levels, and relates particularly to a device for use as a fill level sensor for liquids.

BACKGROUND INFORMATION

Different fill level sensors which utilize different physical effects are known in the art. A capacitive sensor having a changeable dielectric is a possible design, in which, during a change in the fill level, the dielectric proportion of the medium to be measured changes within the capacitor, thereby causing a capacitance change. The fill level may be determined based on the capacitance change. Plate capacitors or flat capacitors (inter-digital structures) designed on the basis of printed boards or punchings are possible, in addition to a design utilizing a cylinder capacitor having the appropriate coaxial structures.

The object of the present invention is to provide a device for measuring fill levels which may be manufactured cost-effectively and which enables measuring as accurately as possible.

SUMMARY

The present invention provides a sensor using two base components, from each of which project finger-shaped electrodes, offset from one another. In this manner, a total capacitance of the device is achieved by multiplying the single capacitances by the number of electrode pairs, thereby approximately achieving a proportional ratio of the pairs of electrodes, submerged in the medium, to the total capacitance. Using a fixing element, the base components are positioned with respect to one another in such a way that a continuous allocation takes place among the electrodes, and such that a minimum interfering proportion of other materials is situated between the electrodes, in order to achieve highest measuring accuracy as possible. Furthermore, rapid flow-off or discharge of the medium during fluctuating fill levels is achieved due to the open structure in the overlapping area of the electrodes, so that a swift response to changing fill levels may take place.

An example embodiment of the present invention provides that the sensor has a meander-shaped inter-digital structure, whereby a simple computation of the total capacitance during changing fill levels may be possible. Inter-digital structure means that there are spaces between the finger-shaped electrodes, into which spaces corresponding finger-shaped electrodes of another base component may be inserted or introduced. There is still a gap between the electrodes of the two base components, which gap is filled by the medium to be measured. A meander-shaped path, facilitating a flow-off of the medium to be measured during fill level changes or fluctuations, is formed due to the meandering path of the gaps between the electrodes.

To achieve a design that is as compact as possible, it is provided according to the present invention that the electrodes of the base components are situated essentially in a plane, so that the sensor has a planar structure.

To improve the flow-off characteristics of the medium to be measured, it is provided according to the present invention that the electrodes are tapered starting from the base component, thereby additionally improving the electrodes's mechanical stability.

Manufacturing the fixing element by using plastic injection molding or plastic extrusion coating is a cost-effective way of aligning the electrodes and the base components to one another, with which method great quantities of sensors having sufficient accuracy may be manufactured. Great position accuracy of the base components, and thus of the electrodes, is achieved by designing the fixing element as a frame, in particular as a closed frame; the frame may also be manufactured by using plastic extrusion coating. Since the extrusion coating material is not situated in the overlapping area of the electrodes, i.e., between the electrodes, the extrusion coating material does not act as a dielectric, and thus the total capacitance, and in turn the measuring accuracy, is not affected.

In order to manufacture the sensor as cost-effectively as possible, it is provided that the base component and the electrodes are manufactured from a pressed screen, e.g., in one piece, the pressed screen being made of a metal which has robust characteristics in the medium surrounding it. As an alternative to such a material selection, the electrodes and optionally the base component may be coated with a protective coating to protect the electrodes against corrosive media.

BRIEF DESCRIPTION OF THE DRAWING

FIGURE shows a schematic representation of a measuring device according to the present invention.

DETAILED DESCRIPTION

The FIGURE shows a schematic representation of a sensor 1, which is made up of two base components 2, 3, from each of which electrodes 20, 30 project in one direction. Electrodes 20, 30 are situated in a plane in the illustrated exemplary embodiment; alternative embodiments or alternative spatial positioning of electrodes 20, 30 may also be provided. Electrodes 20, 30 of both base components 2, 3 face each other and are situated offset from one another in such a way that a meander-shaped gap forms between electrodes 20, 30, into which gap a medium (not shown), a liquid, for example, may penetrate. As a result of this medium's penetration, the total capacitance of sensor 1 changes due to the medium's different dielectric constant in relation to air. Depending on the fill level, the capacitance between the pairs of electrodes thus changes; an electronic unit (not shown) analyzes the capacitance signal and conveys it to a display device or regulates a system correspondingly based on the measured value.

Outside the overlapping area of electrodes 20, 30, i.e., the area in which electrodes 20, 30 do not mesh with one another, a circumferential frame 4 is injection molded onto base components 2, 3 to reliably and inexpensively fix electrodes 20, 30 in position. Finger-shaped electrodes 20, 30 are thus supported on one side on the respective base components 2, 3 and, due to frame 4, the plastic proportion between electrodes 20, 30 is negligibly small with regard to the electric capacitance. This, in particular, has the advantage of providing increased measuring accuracy, since conventional plastics have a high temperature sensitivity with respect to the relative dielectric constants, so that, in the presence of plastic materials between the electrodes, great non-linear changes in the partial capacitance and great non-linear temperature changes make an exact analysis of the fill level difficult.

The planar structure according to the present invention provides free-standing electrodes 20, 30 in the overlapping area, thereby making the plastic proportion negligible with respect to the capacitance, and at the same time, a meander-shaped gap is achieved between electrodes 20, 30, through which gap the flow-off of the liquid or the medium is definitely improved. In the exemplary embodiment illustrated, electrodes 20, 30 are tapered starting from the particular base component 2, 3 (W1>W2), whereby the mechanical stability of electrodes 20, 30, as well as the flow-off characteristics, are further improved.

The structure of sensor 1 may be produced using a pressed screen which, for fixing purposes, is extrusion-coated with a closed or open plastic frame 4. Provided that frame 4, and thus the entire measuring capacitance, is submerged into the medium to be measured, sensors for detecting the relative dielectric constants may also be implemented in this way.

What is claimed is:

1. A capacitive sensor device for measuring a fill level of a medium, the sensor device being connected to an analyzing unit for analyzing a measured signal from the sensor, the sensor device comprising:
   at least a first base component and a second base component, wherein each base component has a plurality of projecting finger-shaped electrodes that are laterally offset from one another, and wherein the projecting electrodes of first base component are positioned in opposing orientation to the projecting electrodes of the second base component such that the projecting electrodes of the first and second base components at least partially overlap; and
   at least one fixing element for fixing the first and second base components in position with respect to one another, wherein the fixing element is positioned outside of an area where the projecting electrodes of the first and second base components overlap;
   wherein the sensor device has a meander-shaped inter-digital structure;
   wherein the electrodes of the first and second base components are tapered starting from the end attached to the respective base component.

2. The sensor device as recited in claim 1, wherein the fixing element is a frame.

3. The sensor device as recited in claim 1, wherein the base components and the projecting electrodes are made from a pressed screen.

4. The sensor device as recited in claim 1, wherein the projecting electrodes have a protective coating.

5. A capacitive sensor device for measuring a fill level of a medium, the sensor device being connected to an analyzing unit for analyzing a measured signal from the sensor, the sensor device comprising:
   at least a first base component and a second base component, wherein each base component has a plurality of projecting finger-shaped electrodes that are laterally offset from one another, and wherein the projecting electrodes of first base component are positioned in opposing orientation to the projecting electrodes of the second base component such that the projecting electrodes of the first and second base components at least partially overlap; and
   at least one fixing element for fixing the first and second base components in position with respect to one another, wherein the fixing element is positioned outside of an area where the projecting electrodes of the first and second base components overlap;
   wherein the sensor device has a meander-shaped inter-digital structure;
   wherein the electrodes of the first and second base components are situated substantially in a common plane;
   wherein the electrodes of the first and second base components are tapered starting from the end attached to the respective base component.

6. The sensor device as recited in claim 5, wherein the fixing element is a frame.

7. The sensor device as recited in claim 5, wherein the projecting electrodes have a protective coating.

8. A capacitive sensor device for measuring a fill level of a medium, the sensor device being connected to an analyzing unit for analyzing a measured signal from the sensor, the sensor device comprising:
   at least a first base component and a second base component, wherein each base component has a plurality of projecting finger-shaped electrodes that are laterally offset from one another, and wherein the projecting electrodes of first base component are positioned in opposing orientation to the projecting electrodes of the second base component such that the projecting electrodes of the first and second base components at least partially overlap; and
   at least one fixing element for fixing the first and second base components in position with respect to one another, wherein the fixing element is positioned outside of an area where the projecting electrodes of the first and second base components overlap;
   wherein the sensor device has a meander-shaped inter-digital structure;
   wherein the electrodes of the first and second base components are situated substantially in a common plane;
   wherein the fixing element is formed by one of plastic injection molding and plastic extrusion coating.

9. The sensor device as recited in claim 8, wherein the fixing element is a frame.

10. The sensor device as recited in claim 8, wherein the projecting electrodes have a protective coating.

* * * * *